United States Patent [19]

Pierre et al.

[11] Patent Number: 5,246,986
[45] Date of Patent: Sep. 21, 1993

[54] BITUMINOUS BINDER EMULSION WITH A VISCOSITY CONTROLLED BY ADDITION OF SCLEROGLUCAN

[75] Inventors: Chaverot Pierre, Oullins; Francis Demangeon, Dardilly; Huet Yves, Carentan, all of France

[73] Assignee: Elf France, Courbevoie, France

[21] Appl. No.: 721,483

[22] PCT Filed: Oct. 25, 1990

[86] PCT No.: PCT/FR90/00771
§ 371 Date: Jun. 25, 1991
§ 102(e) Date: Jun. 26, 1991

[87] PCT Pub. No.: WO91/6606
PCT Pub. Date: May 16, 1991

[30] Foreign Application Priority Data

Oct. 26, 1989 [FR] France ................. 89 14052

[51] Int. Cl.⁵ .................. C08L 5/00; C08L 95/00; C08L 9/06
[52] U.S. Cl. .................. 524/68; 524/70; 524/71; 524/55; 524/56; 524/57; 252/311.5; 106/283

[58] Field of Search .......... 524/68, 70, 71, 55, 524/56, 57; 252/311.5; 106/283

[56] References Cited

U.S. PATENT DOCUMENTS

| | | | |
|---|---|---|---|
| 3,301,848 | 1/1967 | Halleck | 435/99 |
| 3,447,940 | 6/1969 | Halleck | 536/1.1 |
| 4,137,204 | 1/1979 | McDonald | 524/71 |
| 4,548,966 | 10/1985 | Moore | 524/53 |
| 4,879,326 | 11/1989 | Demangeon | 524/60 |

Primary Examiner—Paul R. Michl
Assistant Examiner—La Vonda DeWitt
Attorney, Agent, or Firm—Burgess, Ryan & Wayne

[57] ABSTRACT

A bituminous binder emulsion is provided and is formed from a dispersion of an organic phase consisting of a bituminous binder in an aqueous phase incorporating an emulsifying system made up of one or more emulsifying agents, a water-soluble thickener and optionally, a pH regulating agent. The thickener which may be used to control the viscosity of the emulsion incorporates at least 40% scleroglucan by weight. The emulsion obtained may be used for road building applications, water-proofing in civil engineering or construction works, or for industrial purposes.

25 Claims, No Drawings

BITUMINOUS BINDER EMULSION WITH A VISCOSITY CONTROLLED BY ADDITION OF SCLEROGLUCAN

BACKGROUND OF THE INVENTION

1. Field of the Invention

The invention relates to a bituminous binder emulsion with a viscosity controlled by addition of scleroglucan.

2. Related Art

The use of emulsions of bituminous binders in road construction and repair, for the surfacing of roadways, soil stabilisation, sealing in civil engineering or in buildings or similar applications is well known. The emulsions which are suitable for these applications are generally of the "oil-in-water" type and consist of a dispersion of an organic phase made up of fine globules of the bituminous binder in a continuous aqueous phase, the said aqueous phase containing an emulsifying system which promotes the dispersion of the globules of the bituminous binder in the aqueous phase and consists of one or more emulsifying agents and optionally a pH regulating agent which, depending on the case may be an acid, a water-soluble salt or a base. Such emulsions are usually classified according to the nature of the emulsifying system employed to ensure the dispersion of the bituminous binder in the aqueous phase and according to whether the said emulsifying system consists of one or more anionic, cationic, nonionic or amphoteric emulsifying agents, the corresponding emulsions will be known as anionic, cationic, nonionic or amphoteric respectively.

The emulsion of a bituminous binder is considered to be a means which makes it possible to lower the viscosity of the said binder during the operations making use of this binder. After breaking, the emulsion restores the bituminous binder to which the emulsifying system and other additives which are present in the aqueous phase have been added. The emulsion of bituminous binder behaves like a liquid at room temperature and in the production of surface dressings it is commonplace to incorporate a thickening agent in the aqueous phase of the emulsion, whose function is to increase the viscosity of the emulsion to be spread on the support to be treated so as to keep the emulsion in place on the support and thus, to ensure, before gravel is applied, a uniform distribution of this emulsion on the said support, whatever the slope of the support. Thus, references FR-A-2,577,545 and FR-A-2,577,546 describe cationic emulsions of bituminous binders into which there may be incorporated a thickening agent consisting, for example, of a water-soluble natural resin such as guar gum, gum arabic, ghatti gum, karaya gum, tragacanth gum, locust-bean gum, xanthan gum or else of a water-soluble polyurethane of low molecular mass and especially a polyurethane of viscometric molecular mass of less than 20,000, which results from the action of one or more polyisocyanates with one or more polyols chosen from polyesterpolyols and polyetherpolyols.

The use of conventional thickening agents such as those mentioned above for controlling the viscosity of the emulsions of bituminous binders may result, particularly when the bituminous binder is a bitumen/polymer binder, in breaking of the emulsion which takes place in two stages, namely a first stage of rapid breaking of a part of the emulsion, followed by a second stage of slower breaking of the part of the emulsion which did not break in the first stage, the result being, apart from a long total period of breaking, that a broken bituminous binder is obtained which is not very cohesive and is consequently not highly elastic.

SUMMARY OF THE INVENTION

It has now been found that by employing scleroglucan to form at least a part of the thickening agent employed for controlling the viscosity of an aqueous emulsion of a bituminous binder and especially of a bituminous binder of the bitumen/polymer type, it is possible to overcome the disadvantages resulting from the use of the usual thickening agents, the said use of scleroglucan resulting in a clean break of the emulsion in a relatively short time and with formation of a cohesive broken bituminous binder whose elastic properties correspond substantially to those of the bituminous binder before it is emulsified.

The subject of the invention is therefore a bituminous binder emulsion which is made up of a dispersion of an organic phase consisting of the said bituminous binder in an aqueous phase containing an emulsifying system which consists of one or more emulsifying agents, a water-soluble thickening agent and optionally an agent regulating the pH of the emulsion, the said emulsion being characterized in that the thickening agent contains at least 40% by weight of a scleroglucan.

DESCRIPTION OF THE PREFERRED EMBODIMENT

The thickening agent employed according to the invention consists, therefore, on a weight basis, of 40% to 100% of a scleroglucan and from 60% tb 0% of one or more water-soluble thickening agents other than a scleroglucan and chosen, for example, from natural resins such as guar, carob, alginate or pectin.

The scleroglucans which form part of the composition of the emulsions according to the invention are water-soluble polysaccharides whose molecules consist of a linear main chain made up of D-glucose units linked by $\beta 1,3$ bonds and one out of three of which is linked to a side D-glucose unit by a $\beta 1,6$ bond. These polysaccharides are obtained by fermenting a medium based on sugar and inorganic salts through the action of a microorganism of Sclerotium type. A more complete description of scleroglucans and of their preparation can be found in reference U.S. Pat. No. 3,301,848, the content of which is incorporated in the present description by reference.

The source of scleroglucan may be, according to the invention, a technical scleroglucan, that is to say a scleroglucan isolated from the fermentation medium with its biomass, or a scleroglucan purified from its biomass, the said products being in the form of a powder or else of a more or less concentrated solution in an aqueous and/or hydroalcoholic solvent, or else it is possible to employ the liquid reaction mixture originating from the fermentation and containing the scleroglucan in solution, after optional separation of the solid matter which it contains, by filtration or centrifuging and optional concentration of the said reaction mixture. It is also possible to employ modified scleroglucans obtained by replacing the hydroxyl groups of the D-glucose units with functional groups such as —OR, —OOCR, —OCH$_2$COOH, —OSO$_3$H, —ONO$_2$, —OCS$_2$H or —OOCNHC$_6$H$_5$, with R denoting a C$_1$-C$_6$ alkyl radical, for example methyl, ethyl, propyl or butyl, or a phenyl radical. The preparation of such modified scleroglucans is given in reference U.S. Pat. No. 3,301,848. Also suitable according to the invention are the modified scleroglucans resulting from the treatment of unmodified scleroglucan or of the thickening agent, consisting partly of unmodified scleroglucan, with a dialdehyde reactant such as glyoxal, the said treatment being carried out, for example, by bringing the scleroglucan or the thickening agent containing it, in solution, in suspension or substantially dry, into contact with 0.5% to 10% by weight of the reactant relative to the scleroglucan or to the thickening agent.

The quantity of thickening agent present in the aqueous phase of the emulsion is advantageously chosen so that the said aqueous phase contains, by weight, 100 to 5,000 ppm and preferably 200 to 2,000 ppm of scleroglucan.

The bituminous binder forming the organic phase of the emulsion may consist of a bitumen or of a composition of the bitumen/polymer type, it being possible for this composition to be any one of the products obtained from bitumens to which one or more polymers have been added and optionally modified by reaction with this or these polymers, optionally in the presence of a coupling agent chosen, for example, from sulphur, polysulphides, vulcanisation accelerators and mixtures of such products, it being also possible for the bitumens taking part in the preparation of the said compositions to have been treated, if need be, by the addition of a fluxing agent such as a petroleum cut, a coal oil, a vegetable oil or a mixture of such fluxing agents. The quantity of polymer in these compositions generally represents 0.5 to 15% and preferably 0.7 to 10% of the weight of bitumen. The bitumen employed by itself or in combination with a polymer in a composition of the bitumen/polymer type may be chosen from the various bitumens which have a penetration, defined in accordance with NF standard T 66004, of between 5 and 500 and preferably between 20 and 400. Such bitumens may be, in particular, direct distillation or vacuum distillation bitumens or else oxidised or semioxidised bitumens, the said bitumens having a penetration included within the abovementioned ranges. The polymers which can be present in the bitumen/polymer composition or bitumen/polymer binder may be chosen from the various polymers which are used in combination with bitumens in the bitumen/polymer compositions. The said polymers may be, for example, elastomers such as polyisoprene, butyl rubber, polybutene, polyisobutene, polyacrylates, polymethacrylates, polynorbornene, ethylene/propene copolymers, ethylene/propene/diene terpolymers (EPDM terpolymers) or else fluoro polymers such as polytetrafluoroethylene, silicone polymers such as polysiloxanes, copolymers of olefins and vinyl monomers such as ethylene/vinyl acetate copolymers, ethylene/acrylic ester copolymers, ethylene/vinyl chloride copolymers or polymers of the polyvinyl alcohol, polyamide, polyester or polyurethane type.

The polymer present in the bitumen/polymer composition capable of forming a bituminous binder which can be employed according to the invention is advantageously chosen from random or block copolymers of styrene and of a conjugated diene, because these copolymers dissolve very easily in bitumens and endow the latter with excellent mechanical and dynamic properties and especially very good viscoelasticity properties. In particular, the copolymer of styrene and of a conjugated diene is chosen from block copolymers of styrene and butadiene, of styrene and isoprene, of styrene and chloroprene, of styrene and carboxylated butadiene or of styrene and carboxylated isoprene. The copolymer of styrene and conjugated diene, and in particular each of the abovementioned block copolymers, advantageously have a styrene weight content ranging from 15% to 40%. The average viscometric molecular mass of the copolymer of styrene and conjugated diene, and especially that of the block copolymers mentioned above may be, for example, between 30,000 and 300,000 and preferably lies between 70,000 and 200,000.

The copolymer of styrene and conjugated diene is preferably chosen from the di- or triblock copolymers of styrene and butadiene, of styrene and isoprene, of styrene and carboxylated butadiene or of styrene and carboxylated isoprene, which have styrene contents and molecular masses situated in the ranges defined above.

The bituminous binder may also contain various additives and especially nitrogen compounds such as amines or amides, as promoters of adhesion of the bituminous binder to mineral surfaces.

The quantity of the organic phase made up of the bituminous binder advantageously represents 30 to 90% and preferably 50 to 85% of the weight of the emulsion.

The emulsifying system present in the aqueous phase of the emulsion may be cationic, anionic, nonionic or even amphoteric in nature. An emulsifying system of cationic nature, which gives rise to a cationic emulsion, comprises one or more cationic emulsifying agents which may be chosen advantageously from nitrogenous cationic emulsifying agents such as fatty monoamines, polyamines, amidoamines, amidopolyamines, salts or oxides of the said amines and amidoamines, products of reaction of the abovementioned compounds with ethylene oxide and/or propylene oxide, imidazolines and quaternary ammonium salts. In particular, the emulsifying system of cationic nature may be made up of the combination of one or more cationic emulsifying agents A chosen from cationic nitrogenous emulsifying agents of the type of monoamines, diamines, amidoamines, oxides of such amines or amidoamines, products of the reaction of such compounds with ethylene oxide and/or propylene oxide and quaternar ammonium salts, with one or more emulsifying agents B chosen from cationic nitrogenous emulsifying agents containing in their molecule at least three functional groups chosen from amine and amide groups so that at least one of the said functional groups is an amine group, the ratio of the weight quantity of the compound(s) A to the total weight quantity of the compounds A and B ranging, in particular, from 5% to 95%. An emulsifying system of anionic nature, which gives rise to an anionic emulsion, comprises one or more anionic emulsifying agents which can be chosen especially from the alkali metal or ammonium salts of fatty acids, alkali metal polyalkoxycarboxylates, alkali metal N-acylsarcosinates, alkali metal hydrocarbylsulphonates and especially sodium alkylsulphonates, sodium arylsulphonates and sodium alkylarylsulphonates, sodium alkylarenesulphonates, sodium lignosulphonates, sodium dialkylsulphosuccinates and sodium alkylsulphates. It is also possible to employ an emulsifying system of nonionic nature made up of one or more nonionic emulsifying agents which may be chosen especially from ethoxylated fatty alcohols, ethoxylated fatty acids, sorbitan esters, ethoxylated sorbitan esters, ethoxylated alkylphenols, ethoxylated fatty amides and fatty acid esters of glycerine. It is also possible to employ an emulsifying system of amphoteric nature made up of one or more amphoteric emulsifying agents which may be chosen, for example, from betaines and amphoteric imidazolinium derivatives. It is also possible to employ an emulsifying system consisting of a mixture of emulsifying agents of different natures, for example a mixture of one or more anionic or cationic emulsifying agents with one or more nonionic and/or amphoteric emulsifying agents. For further details on the emulsifying agents capable of forming emulsifying systems which can be employed according to the invention reference may be made to the Kirk-Othmer manual entitled Encyclopedia of Chemical Technology, third edition, volume 22, pages 347 to 360 (anionic emulsifiers), pages 360 to 377 (nonionic emulsifiers), pages 377 to 384 (cationic emulsifiers) and pages 384 to 387 (amphoteric emulsifiers).

The quantity of emulsifying system present in the emulsion may vary fairly widely. This quantity may advantageously represent from 0.03% to 3% and preferably from 0.06% to 2% of the total weight of the emulsion.

The agent which is optionally employed for adjusting the pH of the emulsion to the desired value may be an acid, for example an inorganic acid such as HCl, $HNO_3$, $H_3PO_4$ or a saturated or unsaturated mono- or polycarboxylic acid such as acetic acid, formic acid, oxalic acid or citric acid, when the value of the pH of the emulsion must be lowered, or else a base or a basic salt, especially an inorganic base consisting of an alkali metal hydroxide such as sodium hydroxide or of an alkaline-earth metal oxide or hydroxide, when the value of the pH of the emulsion must be raised.

The emulsions according to the invention are prepared by producing, in an emulsion-forming region and especially in an apparatus of the colloid mill type, an intimate dispersion of the bituminous binder in an aqueous phase containing the emulsifying system and the thickening agent based on scleroglucan, in quantities which are appropriate to obtain the concentrations defined above, and optionally the pH-regulating agent. To do this, on the one hand, the bituminous binder in the form of a molten mass whose temperature is between 80° C. and 180° C. and preferably between 120° C. and 160° C. and, on the other hand, the aqueous phase containing the above-mentioned ingredients and being at a temperature of between 15° C. and 80° C. and preferably between 20° C. and 60° C. are brought simultaneously and separately to the emulsion-forming region and the whole is kept in the said region for a sufficient period to form the emulsion.

The aqueous phase which is mixed with the bituminous binder in the emulsion-forming region is prepared by introducing the thickening agent, the emulsifying system and, when employed, the pH-regulating agent into the quantity of water needed for the manufacture of the emulsion and preheated to a temperature of between 30° C. and 75° C. The respective quantities of thickening agent and of emulsifying system which are added to the water are chosen so that the concentrations of these ingredients in the resulting emulsion lie in the ranges defined above. The quantity of the pH-regulating agent, when employed, is adjusted to bring the pH of the emulsion to the chosen value. The ingredients, namely scleroglucan-based thickening agent, emulsifying system and, if appropriate, pH-regulating agent which are added to the water may be added in any order. However, it is preferable first to dissolve the scleroglucan-based thickening agent in the water intended to form the aqueous phase of the emulsion and then next to incorporate the emulsifying system in the solution obtained and finally to adjust the pH of the mixture thus produced, if need be, by adding, according to circumstances, an acid or a base. When the source of thickening agent consists of a scleroglucan modified with a dialdehyde of the glyoxal type or contains such a modified scleroglucan, the dissolution of the said modified scleroglucan can be accelerated by bringing the pH of the medium employed to dissolve it to a value above 7 by adding a base or a basic emulsifying agent.

In the preparation of the emulsion the aqueous phase containing the scleroglucan-based thickening agent, the emulsifying system and the optional pH-regulator, on the one hand, and the bituminous binder, on the other hand, are brought to the emulsion-forming region in such proportions that the resulting emulsion advantageously contains, by weight, as indicated above, 30 to 90% and preferably 50 to 85% of organic phase consisting of the bituminous binder.

The emulsions according to the invention are very particularly suitable for road building technology applications, for sealing in civil engineering or the building industry or else for industrial applications.

The invention is illustrated by the following examples, given without any limitation being implied.

In these examples the quantities and percentages are expressed by weight unless shown otherwise.

EXAMPLE 1

Three anionic emulsions were prepared of a bituminous binder consisting of a bitumen exhibiting a penetration of approximately 140/160 and a dynamic viscosity equal to 100 Pa s, the first emulsion (emulsion 1.A) containing a thickening agent consisting of scleroglucan modified with glyoxal, the second (emulsion 1.B) containing a control thickening agent consisting of a xanthan gum, and the third (emulsion 1.C) being free from thickening agent.

The thickening agent according to the invention, employed in the preparation of emulsion 1.A, was obtained by treating, with stirring in a mixer for approximately 10 minutes, 200 parts of Actigum CS11 scleroglucan powder, marketed by Sanofi Bioindustries (France), with a solution resulting from mixing 1.6 parts of monosodium citrate, 8 parts of water, 0.8 parts of an aqueous solution of glyoxal at a concentration of 30% and 16 parts of isopropyl alcohol, and then drying the treated product at 60° C. for two hours.

The emulsification of the bituminous binder was carried out as follows.

The aqueous phase of the emulsions was formed first of all by dissolving, in an appropriate quantity of water, the thickening agent and then the emulsifying agent in the case of the aqueous phase of emulsions 1.A and 1.B or the emulsifying agent alone in the case of the aqueous phase of the emulsion 1.C, and the pH of each aqueous phase was brought to a value of 10 by adding sodium hydroxide. The emulsifying agent employed in each case consisted of the sodium salt of a mixture of $C_{14}$-$C_{18}$ fatty acids and was employed in a quantity representing 2.5% of the aqueous phase. In the aqueous phase prepared to form the emulsion 1.A the thickening agent consisted of scleroglucan modified with glyoxal and was employed in a quantity representing 0.05% of the aqueous phase. In the aqueous phase prepared to form the emulsion 1.B the thickening agent consisted of a xanthan gum and was employed in a quantity representing 0.04% of the aqueous phase. The aqueous phase prepared to form the emulsion 1.C did not contain any thickening agent.

The emulsion was produced in an emulsifier of the colloid mill type, into which 400 parts of the aqueous phase prepared as shown above and heated to 45° C. and 600 parts of the bituminous binder, heated to 145° C., were introduced simultaneously and separately.

1,000 parts of anionic emulsion were obtained, whose characteristics are given below.

| Emulsion: | 1.A | 1.B | 1.C |
|---|---|---|---|
| pH: | 10 | 10 | 10 |
| Thickening agent: | | | |
| Nature: | Glyoxal modified scleroglucan | Xanthan gum | None |
| Quantity in the emulsion: | 0.02% | 0.016% | |
| Emulsifying agent content: | 1% | 1% | 1% |
| Bituminous binder content: | 60.9% | 60.8% | 59.8% |
| Viscosity according to ASTM standard E 102 (seconds) | 24 | 20 | 14 |
| Settling after 6 days | 1.2% | 4.6% | 18.6% |

EXAMPLE 2

Two cationic emulsions were prepared of a bituminous binder consisting of a bitumen known as "emulsifiable" grade, exhibiting a penetration value of 180/220, the first emulsion containing a scleroglucan-based thickening agent (emulsion 2.A according to the invention) and the second containing no thickening agent (control emulsion 2.B).

The thickening agent employed in the preparation of emulsion 2.A was a technical scleroglucan marketed by Sanofi Bioindustries under the name Actigum CS6 and consisting of a scleroglucan separated by precipitation from the reaction mixture originating from the fermentation process giving rise to scleroglucan and unpurified, the said technical scleroglucan containing 70% of scleroglucan and 30% of biomass.

The emulsification of the bituminous binder was carried out as indicated below.

Aqueous phases of the emulsions were made up by dissolving, in an appropriate quantity of water, first of all the technical scleroglucan and then the emulsifying agent in the case of the aqueous phase of emulsion 2.A, or the emulsifying agent by itself in the case of the aqueous phase of emulsion 2.B, after which the pH of each aqueous phase was brought to a value of 3 by adding 20° Bé hydrochloric acid (d=1.16). The various operations for making up the aqueous phases of the emulsions were carried out at 60° C. and, in addition, the dissolving of the technical scleroglucan in the aqueous phase corresponding to emulsion 2.A was carried out with stirring at a very high shearing rate for 5 to 6 hours. The quantity of technical scleroglucan employed represented 0.1% of the aqueous phase. The emulsifying agent employed in each case consisted of a tallow propylenediamine marketed by CECA under the name Dinoram S and was employed in a quantity representing 0.5% of the aqueous phase.

The emulsion was produced in an emulsifier of the colloid mill type into which 300 parts of the aqueous phase prepared as shown above at 60° C. and 700 parts of the bituminous binder heated to 145° C. were introduced simultaneously and separately.

1000 parts of cationic emulsion were obtained in each case; its viscosity characteristics are given below:

| Emulsion: | 2.A | 2.B |
|---|---|---|
| Kinematic viscosity (m²/s): | $2 \times 10^{-3}$ | $1.1 \times 10^{-3}$ |
| Pseudoviscosity at 25° C. with an orifice 4 mm in diameter according to NF T 66005 (s): | 150 | 75 |

EXAMPLE 3

Three cationic emulsions were prepared, of a bituminous binder consisting of a bitumen modified with a polymer (bitumen/polymer binder), the first emulsion containing a scleroglucan-based thickening agent (emulsion 3.A according to the invention), the second containing a control thickening agent consisting of a xanthan gum (emulsion 3.B) and the third containing no thickening agent (emulsion 3.C).

The thickening agent employed in the preparation of emulsion 3.A was a scleroglucan modified with glyoxal, the said modified scleroglucan being obtained by treating a technical scleroglucan similar to that in Example 2 with glyoxal under the conditions described in Example 1.

The bitumen/polymer binder employed in the preparation of the three emulsions consisted of the product of reaction of a road bitumen with a penetration of 180/220, at elevated temperature, with a master solution consisting of a solution of sulphur and of a styrene/butadiene block copolymer containing 25% of styrene in a petroleum cut obtained in a refinery after catalytic cracking of heavy distillates and called "Light Cycle Oil", the said cut having a distillation range of the order of 180° C. to 360° C. The operating procedure for preparing the bitumen/polymer binder was as follows. Twenty parts of the block copolymer were dissolved in 80 parts of the petroleum cut at a temperature of between 80° C. and 100° C. When the polymer was completely dissolved, 0.6 parts of sulphur were added to the solution. Fifteen parts of the solution thus prepared were mixed with 85 parts of the road bitumen and the mixture was heated to a temperature of between 170° C. and 180° C. for approximately 1.5 hours.

Emulsification of the bituminous binder of the bitumen/polymer type was carried out as indicated below.

The aqueous phase of each emulsion was made up by dissolving, in an appropriate quantity of water, first of all the thickening agent and then the emulsifying system in the case of the aqueous phase of each of the emulsions 3.A and 3.B, or the emulsifying system by itself in the case of the aqueous phase of emulsion 3.C, after which the pH of each aqueous phase was brought to a value of 6 by adding 20°Bé hydrochloric acid. The various operations for making up the aqueous phases were carried out at 60° C.; in addition, the dissolving of the thickening agent in the aqueous phase corresponding to emulsion 3.A or 3. B was performed with moderate stirring, the quantity of thickening agent employed in each case representing 0.08% of the aqueous phase. The emulsifying system employed in each case was a mixture of tallow propylenediamine (Dinoram S) and of a tallow polypropylene polyamine marketed under the name Lilamuls EM 30, the respective quantities of Dinoram S and Lilamuls EM 30 representing 0.045% and 0.4% of the aqueous phase.

Each emulsion was produced in an emulsifier of the colloid mill type, into which 300 parts of the aqueous phase at 60° C. and 700 parts of the bitumen/polymer bituminous binder heated to 145° C. were introduced simultaneously and separately.

1,000 parts of cationic emulsion were obtained in each case; its viscosity characteristics are given below.

| Emulsion: | 3.A | 3.B | 3.C |
|---|---|---|---|
| Kinematic viscosity (m²/s): | $6 \times 10^{-4}$ | $5.6 \times 10^{-4}$ | $3.8 \times 10^{-4}$ |
| Pseudoviscosity at 25° C. with an orifice of 4 mm in diameter according to NF T 66005 (s): | 42 | 40 | 28 |

In the case of each of the emulsions 3.A to 3.C the breaking value with siliceous fines was also determined, evaluated according to NF standard T 66017 and representing the minimum quantity, expressed in grams, of siliceous sand of 40 to 150 μm particle size producing the breaking of 100 g of emulsion with formation of a bituminous binder/sand clot.

The following results were obtained:

| Emulsion: | 3.A | 3.B | 3.C |
|---|---|---|---|
| Breaking value (g) | 40-45 | >80*) | 40-45 |

*) breaking in two parts, no cohesion of the clot of binder-coated siliceous fines.

EXAMPLE 4

A cationic emulsion was prepared from a bituminous binder consisting of the bitumen/polymer binder whose preparation is described in Example 3, the said emulsion containing a thickening agent consisting of the technical scleroglucan employed in Example 2.

Emulsification of the bituminous binder was carried out as indicated below.

The aqueous phase of the emulsion was made up by dissolving, in an appropriate quantity of water, first of all the thickening agent and then the emulsifying system, after which the pH of the aqueous phase was brought to the value of 6 by adding 20°Bé hydrochloric acid. The various operations for making up the aqueous phase were carried out at 60° C. and in addition the dissolving of the thickening agent in the aqueous phase was carried out with stirring at a very high shearing rate for approximately 5 hours, the quantity of thickening agent employed representing 0.1% of the aqueous phase. The emulsifying system employed was a mixture of Dinoram S and Lilamuls EM 30 in quantities representing 0.045% and 0.4% of the aqueous phase respectively.

The emulsion was produced in a colloid mill into which 300 parts of the aqueous phase at 60° C. and 700 parts of the bituminous binder of the bitumen/polymer type heated to 145° C. were introduced simultaneously and separately.

1,000 parts of cationic emulsion were obtained, exhibiting a pseudoviscosity, determined as indicated in Example 3, of 40 s and a breaking value with siliceous fines, evaluated according to NF standard T 66017, of approximately 50 g.

We claim:

1. Bituminous binder emulsion made up of a dispersion of an organic phase consisting of the said bituminous binder in an aqueous phase containing an emulsifying system which consists of one or more emulsifying agents, a water-soluble thickening agent and optionally an agent regulating the pH of the emulsion, and wherein the thickening agent contains at least 40% by weight of a scleroglucan.

2. Emulsion according to claim 1, wherein the thickening agent contains 40 to 100% by weight of a scleroglucan.

3. Emulsion according to claim 1 wherein the thickening agent consists of a mixture of a scleroglucan and of one or more thickening agents other than scleroglucans.

4. Emulsion according to claim 1, wherein the scleroglucan employed is a scleroglucan isolated from its preparation mixture and optionally purified.

5. Emulsion according to claim 1, wherein the scleroglucan employed consists of the liquid reaction mixture originating from its preparation and containing the scleroglucan in solution, after optional separation of the solid matter present in the said mixture and optional concentration of the latter.

6. Emulsion according to claim 1, wherein the scleroglucan employed is a modified scleroglucan obtained by replacing the hydroxyl groups of the D-glucose units of scleroglucan with functional groups.

7. Emulsion according to claim 1, wherein the scleroglucan employed is a scleroglucan modified by treatment with a dialdehyde.

8. Emulsion according to claim 1, wherein the quantity of thickening agent present in the aqueous phase of the emulsion is chosen so that the said aqueous phase contains, by weight, 100 to 5,000 ppm of scleroglucan.

9. Emulsion according to claim 1, wherein the bituminous binder forming the organic phase of the emulsion consists, of a bitumen.

10. Emulsion according to claim 1, wherein the bituminous binder forming the organic phase of the emulsion consists of a composition of the bitumen/polymer type.

11. Emulsion according to claim 10, wherein the composition is a copolymer of styrene and of a conjugated diene selected from the group consisting of the styrene/butadiene, styrene/isoprene, styrene/chloroprene, styrene/carboxylated butadiene and styrene/carboxylated isoprene block copolymers.

12. Emulsion according to claim 1, wherein the organic phase made up of the bituminous binder represents 30 to 90% of the weight of the emulsion.

13. Emulsion according to claim 1, wherein the emulsifying system present in the aqueous phase of the emulsion is made up of one or more cationic emulsifying agents.

14. Emulsion according to of claim 1, wherein the emulsifying system present in the aqueous phase of the emulsion is made up of one or more anionic emulsifying agents.

15. Emulsion according to claim 1, wherein the emulsifying system present in the aqueous phase of the emulsion is made up of one or more nonionic emulsifying agents.

16. Emulsion according to claim 1, wherein the emulsifying system present in the aqueous phase of the emulsion consists of one or more amphoteric emulsifying agents.

17. Emulsion according to claim 1, characterized in that it contains, by weight, 0.03% to 3% and preferably 0.06% to 2% of emulsifying system.

18. Emulsion according to claim 1, wherein the bituminous binder forming the organic phase of the emulsion is comprised of a bitumen/polymer composition in which the copolymer is a copolymer of styrene and of a conjugated diene.

19. Emulsion according to claim 1, wherein the thickening agent contains 100% by weight of a scleroglucan.

20. Emulsion according to claim 1, wherein the scleroglucan employed is a scleroglucan modified by treatment with glyoxal.

21. Emulsion according to claim 1, wherein the quantity of thickening agent present in the aqueous phase of the emulsion is chosen so that the said aqueous phase contains, by weight, 200 to 2,000 ppm of scleroglucan.

22. Emulsion according to claim 10, wherein the composition which is a copolymer of styrene and of a conjugated diene is selected from the group consisting of styrene/butiene, styrene/isoprene, styrene/chloroprene, styrene/carboxylated butadiene and styrene/carboxylated isoprene block copolymers, said copolymer having a styrene weight content ranging from 15% to 40%.

23. Emulsion according to claim 1, wherein the organic phase made up of the bituminous binder represents 50 to 85% of the weight of the emulsion.

24. Emulsion according to claim 1, wherein the emulsifying system present in the aqueous phase of the emulsion is made up of one or more nitrogenous cationic emulsifying agents.

25. Emulsion according to claim 1, which contains, by weight, 0.06% to 2% of the emulsifying system.

* * * * *